United States Patent [19]

Matthews et al.

[11] 3,838,998

[45] Oct. 1, 1974

[54] PROCESS FOR FORMING HOLLOW GLASS MICRO-SPHERES FROM ADMIXED HIGH AND LOW TEMPERATURE GLASS FORMERS

[75] Inventors: William R. Matthews, E. 104-31st; Richard W. Carson, both of Spokane, Wash.

[73] Assignee: said Matthews, by said Carson

[22] Filed: Apr. 23, 1973

[21] Appl. No.: 353,328

Related U.S. Application Data

[63] Continuation-in-part of Ser. No. 104,635, Jan. 7, 1971, abandoned.

[52] U.S. Cl............................. 65/21, 65/22, 106/50, 106/DIG. 8
[51] Int. Cl............................................. C03b 19/10
[58] Field of Search............. 65/21; 106/40 V, 40 R, 106/50, DIG. 8

[56] References Cited
UNITED STATES PATENTS

| | | | |
|---|---|---|---|
| 2,485,724 | 10/1949 | Ford | 106/40 R |
| 2,582,852 | 1/1952 | Shoemaker | 106/40 V |
| 3,010,835 | 11/1961 | Charles et al. | 106/40 R |
| 3,574,655 | 4/1971 | Goldsmith | 106/40 V |
| 3,699,050 | 10/1972 | Henderson | 106/40 V X |
| 3,978,340 | 4/1961 | Veach et al. | 65/21 |

*Primary Examiner*—Robert L. Lindsay, Jr.
*Attorney, Agent, or Firm*—Wells, St. John & Roberts

[57] ABSTRACT

A process for forming hollow glass micro-spheres with walls of controllably variable thickness in a size range of 50 to 5,000 microns, embodying (1) preparation of a water slurry of finely particulated, high temperature and low temperature glass formers; (2) prilling the slurry in a vertical spray drying tower; (3) separating and supporting the individual prilled feed material; (4) heating the feed material to glassification of the high temperature glass former while maintaining appropriate geometry and shell thickness and (5) cooling the finished product. The high temperature glass former is preferably a naturally occurring soda feldspar. The process is particularly adapted to form thicker walled micro-spheres of larger size and high quality.

11 Claims, 7 Drawing Figures

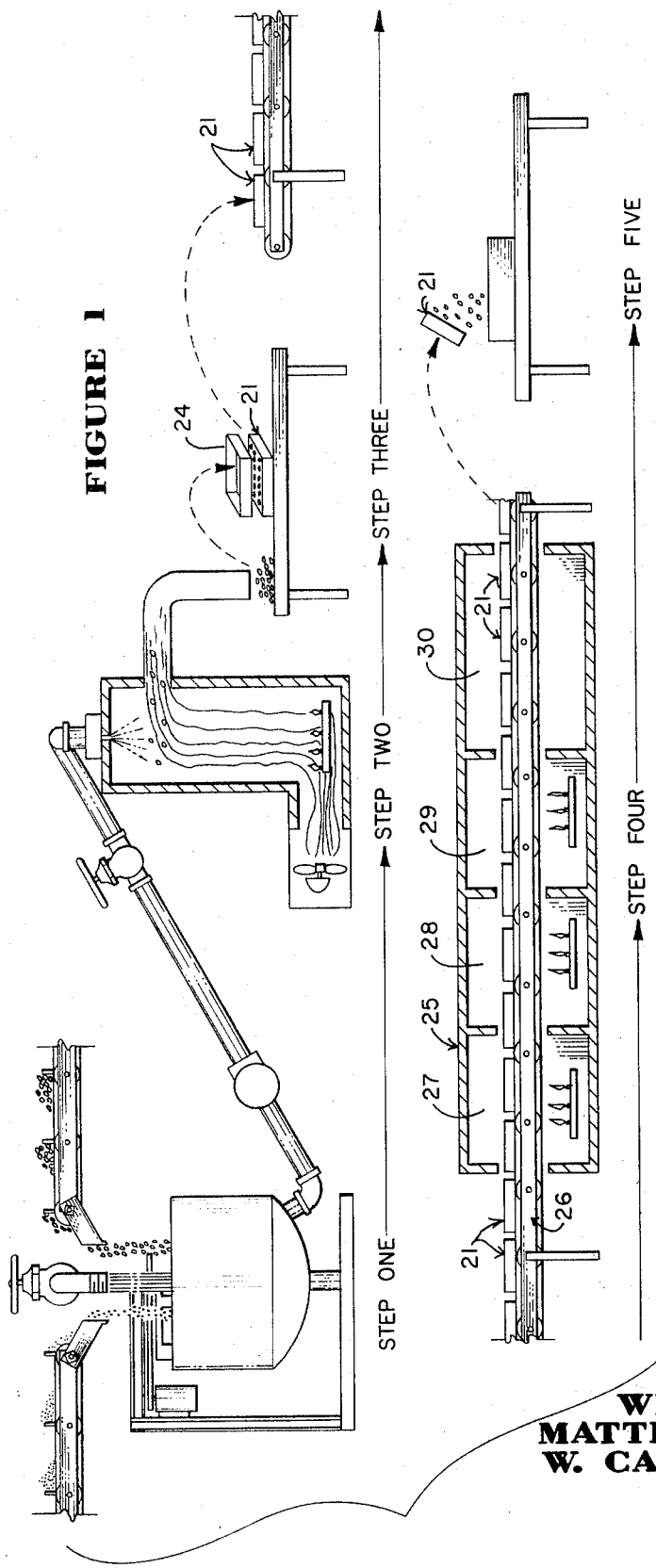
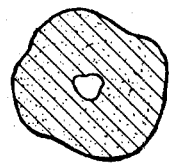
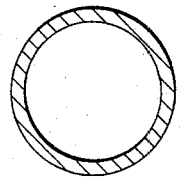
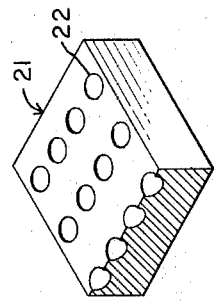

PROCESS FOR FORMING HOLLOW GLASS MICRO-SPHERES FROM ADMIXED HIGH AND LOW TEMPERATURE GLASS FORMERS

BACKGROUND OF THE INVENTION

RELATED APPLICATIONS

This is a Continuation-in-Part of Co-Pending U.S. Pat. application Ser. No. 104,635 filed Jan. 7, 1971 now abandoned and titled "Process for Forming Hollow Glass Micro-Spheres from Admixed High and Low Temperature Glass Formers".

FIELD OF INVENTION

This invention relates generally to the formation of hollow glass micro-spheres, and more particularly to a process for forming larger micro-spheres of relatively great wall thickness and high perfection from admixed high and low temperature glass formers.

DESCRIPTION OF PRIOR ART

Modern material technology has taught of incorporating structural elements having desirable physical characteristics in a dissimilar matrix, such as plastic resins. Hollow glass micro-spheres have been found particularly advantageous as such structural elements as they contribute stiffness and strength yet often permit a reduction in weight of the ultimate product because of their great stiffness and strength in proportion to density. These thin shell reinforced matrixes, commonly called syntactic foams, are generally characterized by high compressive strength, bulk modulus and modulus of resilience combined with low density. Hollow glass beads heretofore used in syntactic foams have had densities in the order of 0.2 to 0.35 grams per cubic centimeter, hydrostatic strengths in water of the order of 2,000 psi, sizes ranging generally below 250 microns and a relatively low degree of perfection in spheroidicity, uniformity of wall thickness, inclusions, flaws and other physically detrimental characteristics.

The disadvantages of known glass micro-spheres have centered largely about their small size. When used in a matrix material, they tend to aid retention of pores in the composite and create compositional non-homogeniety because of sphere segregation, agglomeration and inadequate infiltration of matrix material into the spaces at the sphere exteriors. The resulting non-homogenous distribution of materials tend to create load distribution problems and the great surface area per unit volume of the glass spheres creates problems of chemical durability and especially differential leaching in aqueous environs. Smaller sphere size tends to magnify the effects of sphere imperfections.

Larger glass micro-spheres of greater wall thickness and a higher degree of physical and chemical perfection would obviate most, if not all, of these problems.

The instant process provides a feed particle formed by prilling. Each cooled feed particle comprises a peripheral shell of intermixed high and low temperature glass formers enclosing a central void. Upon appropriate heat treatment the shell forms a continuous film to contain internal void expansion sufficiently to maintain a hollow micro-sphere of appropriate geometry during completion of glassification of the peripheral shell. The particle during glassification is individually separated and supported to aid in assuring its resultant spheroidal hollow geometry.

Our present invention is distinguished from other processes for forming discrete hollow glass beads in providing shell forming material comprising particulated intermixed high and low temperature glass formers, the high temperature glass former being such as to increase viscosity and surface tension of the microsphere during the final glassification process to maintain proper geometry. Similarly the high temperature glass former during glassification evolves sufficient gas to maintain internal pressure within the bubble at an appropriate level, rather automatically related to surface tension and viscosity, to maintain the spheroidal shell geometry. The higher shell viscosity allows formation of larger beads with controllable configuration.

SUMMARY OF THE INVENTION

Our invention provides a method for forming high quality hollow glass micro-spheres by a discrete process primarily for sophisticated usages. In so doing we (1) provide a feed composition embodying particulated, high temperature and low temperature glass formers admixed with water and appropriate additives to form a slurry for prilling; (2) prill the slurry to form and dry spheridized feed particles with an outer shell in a size range approximating 300 microns defining an internal void; (3) cool the feed particles; (4) separate and support the individual feed particles while heating them to an elevated temperature in a chamber, preferably having an inert or reducing atmosphere to glassify the outer shell and form a spherical shell of desired physical characteristics; and (5) cool the product to solidification.

The high temperature glass former of our process is preferably a naturally occurring, thermally bloatable, soda feldspar. The low temperature glass former is preferably a soluble sodium silicate. The prilling is normally carried out in a mechanism of the vertical spray-dryer type wherein various parameters may be appropriately adjusted to obtain feed particles of the desired character. The heating step may be regulated to cause bloating of forming hollow micro-spheres to produce an ultimate product with desired geometrical parameters and quite homogenous composition, but with a porous shell.

In providing such process and compositions, it is:

A principal object of our invention to provide a discrete, controllable process for forming large, high quality hollow glass microspheres in a size ranging to several thousand microns.

A secondary object of our invention to provide a material for formation of such micro-spheres comprising particulated, intermixed high temperature and low temperature glass formers, of such nature that the low temperature glass former may form a film about and support the high temperature glass former during glassification.

A further object of our invention to provide a high temperature glass former, such as a naturally occurring soda feldspar, that intumesces upon heating to provide internal pressure in the void defined within a glass micro-sphere to create and maintain its geometry during the viscous stage.

A further object of our invention is to provide such a high temperature glass former that upon solution in the low temperature glass former substantially increases the viscosity and surface tension of the resultant glass to allow formation of large micro-spheres.

A still further object of our invention to admix such glass formers in the form of a slurry adapted to prilling with sufficiently controllable parameters to allow formation of hollow feed particles of appropriate configuration and size.

A still further object of our invention to provide practical methods for separating and supporting the individual feed particles during heating to glassification of the high temperature glass former.

A still further object of our invention to provide a heating process wherein particle geometry, and particularly wall thickness, may be controlled by successive expansion and collapse of the glass shell to form spheres of predetermined size and wall thickness and relatively perfect structure.

Still other and further objects of our invention are to provide a new and novel process for the simple and economic manufacture of hollow glass micro-spheres of a high degree of both physical and chemical perfection for sophisticated uses requiring such characteristics.

Other and further objects of our invention will appear from the following specification and accompanying drawings which form a part thereof.

A BRIEF DESCRIPTION OF THE DRAWINGS

In the accompanying drawings which form a part of this specification and wherein like numbers of reference refer to similar parts throughout:

FIG. 1 is a diagrammatic representation of our process, continued on two lines, to show its various steps and their relationship.

FIG. 2 is a partially cut-away, isometric view of a type of carbon boat used to support micro-spheres during heating.

FIG. 3 is a greatly enlarged, diametrical cross-sectional view of an idealized prilled feed particle for our process.

FIG. 4 is a greatly enlarged diametrical cross-sectional view of an idealized hollow glass sphere of our process.

GENERAL DISCUSSION

Figure 5:
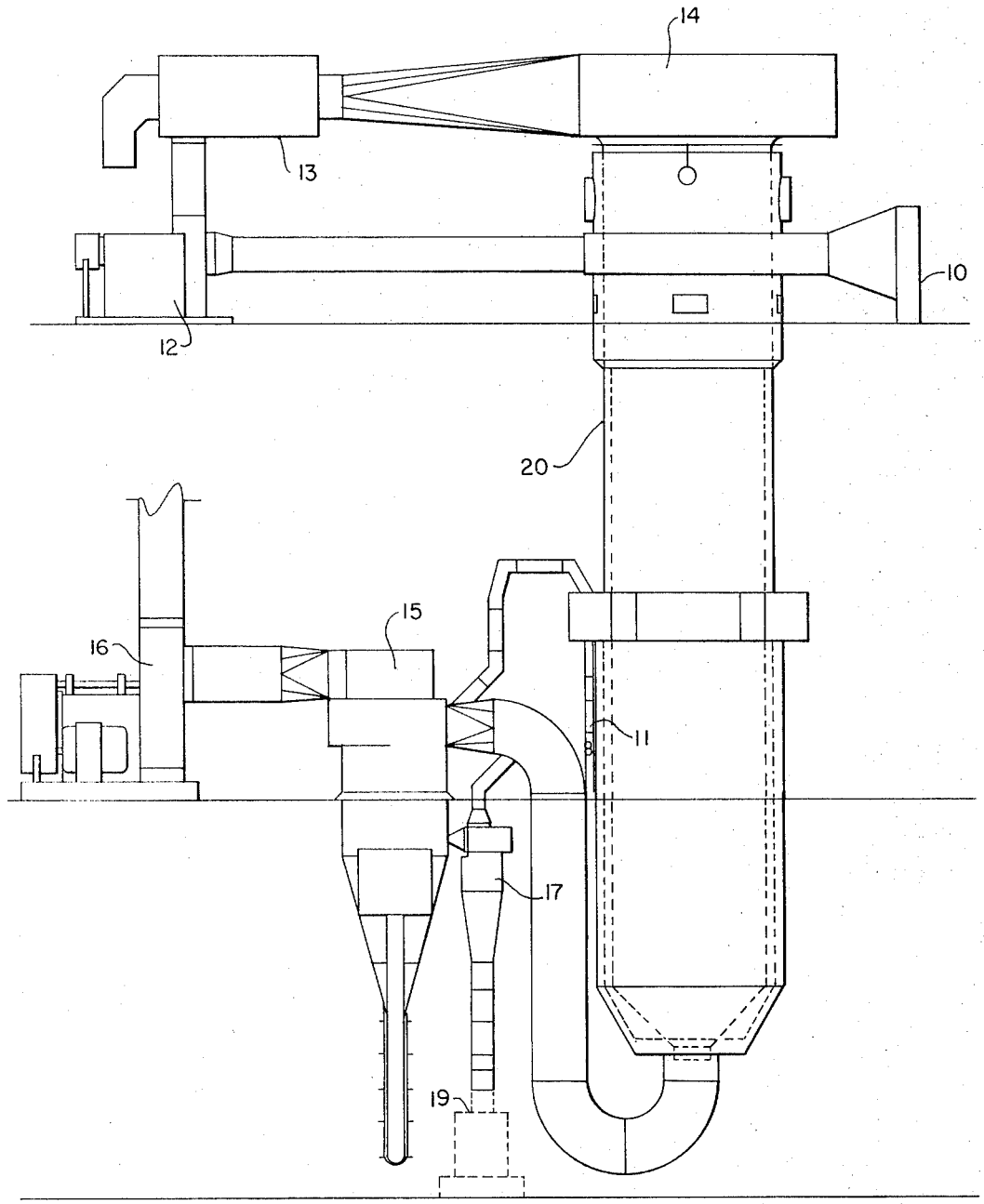
FIG. 5 is a semi-diagrammatic illustration of a vertical prilling tower of commerce, showing its various essential parts and their relationship.

Our work with hollow glass beads has made a number of fundamental considerations apparent. An understanding of these principles aids the understanding of our process.

Certain essential limitations relating to size and refining conditions are imposed upon hollow glass beads. If:

$$P_1 - P_2 = 4S/R \qquad \text{Equation 1}$$

where
$P_1$ = internal pressure
$P_2$ = external pressure
$S$ = surface tension expressed in dynes/cm, and
$R$ = average radius of the sphere it is readily seen that in larger spheres there must be a decrease in internal pressure and an increase in surface tension to maintain spherical geometry. The relationship between diameter and internal pressure make it clear that there are definite upper limits in the production of thin spherical glass beads especially when the feed particle is rigidly supported against gravity. In larger spheres the gravity force becomes more important. The excess internal pressure of the spheres diminishes with increased sphere diameter. Increased viscosity, of course, if it can be brought to be, increases the stability of the spherical geometry.

Glass refining processes, requiring the coalescense of seeds formed within the glass melt with subsequent migration and liberation at the glass-air interface, pose further restrictions. Internal pressure of extremely small seeds within the melt far exceed the strength of the melt, so the seeds grow to equilibrium size following the teachings of Equation 1. When two seeds or bubbles touch, the larger grows at the expense of the smaller and if the viscosity of the melt is low enough, the bubbles will gradually rise by gravity to a surface. In so doing they expand in size by decrease of internal pressure and growth by capture. As both viscosity and wall thickness increase the process becomes more complex and seed migration rate declines so that more seeds are retained within the melt to yield a microsphere of lower strength and nonhomogenous composition. The condition also creates a tendency to form holes in the shell which may release internal pressure to cause collapse of the spherical geometry. This process may be exploited, however, as later noted, to regulate size and wall thickness of the microspheres.

With these considerations, the largest sized microspheres that might be produced with lead oxide or $B_2O_3$ fluxed melts are about of 0.5 millimeter diameter and the largest produceable with aluminosilicate glasses are of the order of 3 millimeters. Spheres approaching both dimensions have been experimentally produced. The complete nature of glass refining is not understood but it does appear that if the viscosity of the melt be increased at the expense of some homogeneity and bubble strength, it might be possible to produce bubbles of somewhat larger size, possibly varying by a factor on the order of 2.

Glass has attributes that render it quite amenable to strength calculations, but it commonly embodies flaws that complicate the theory. In an unconstrained thin-shelled sphere that is subject to uniform external pressure (as hydrostatically) the strength formula for a glass micro-sphere (as originally given by Roark) is:

$$S_1 - S_2 = PR/2t \qquad \text{Equation 2}$$

where
$S_1$ = meridional membrane stress, positive when tensile
$S_2$ = hoop membrane stress, positive when tensile
$P$ = unit pressure
$R$ = radius of curvature
$t$ = wall thickness
and
$$P^1 = [2\, Et^2/r^2\, \sqrt{3(1-V^2)}] \qquad \text{Equation 3}$$

where
$P^1$ = unit pressure at which elastic buckling occurs
$E$ = elastic modulus
$t$ = wall thickness $r$ = sphere radius
$v$ = Poisson's ratio The actual measured buckling is somewhat lower than that indicated by the equations, apparently by reason of deviations from spheroidicity and irregular disturbances during loading.

Data revealed by use of the foregoing theory indicates that spheres having density on the order of 0.35 grams per cubic centimeter fail by elastic buckling. Improvements in sphere strength under unsupported hydrostatic loading must therefore be obtained by improvement in elastic modulus and Poisson's ratio. With the theoretical limit of elastic modulus for glass being $\sim 17 \times 10^6$ psi and the actual measured value being $\sim 13 \times 10^6$ psi, the obtainable strength in such microspheres could not appreciably exceed 25,000 psi. The present state-of-the-art has produced beads with strengths approximating 2,500 psi. The instant process provides an optimized product which approaches strengths of 20,000 psi.

The foregoing considerations assume independence of sphere diameter and glass thickness. Griffith's flaws generally are the limiting factor in glass strength, and the critical flaw size appears to be about 5 microns. The probability of flaw occurrence increases with increased surface area - the depth of the flaws, of course, being limited by absolute thickness. It is reasonable to expect large Griffith's flaws in larger diameter beads of greater thickness. The exact effect of these flaws is not known. It appears that they most probably outweigh compositional homogeneity at the 5 or 6 millimeter range of sphere size.

It thus appears that given the same glass composition and same particle density, macro-spheres will be stronger than micro-spheres above certain size ranges. However, where wall thicknesses are great enough to contain large flaws, the effect will be less pronounced as size is further increased. It appears that no advantage in strength can be obtained by increase in micro-sphere size if density is kept constant. If optimum strength under hydrostatic type compression is desired, improvements cannot be made simply by an increase in sphere size but must be based upon increased Young modulus and Poisson's ratio and upon uniformity of composition, radius, and wall thickness. Our process and materials optimize micro-spheres of large size having strengths approaching theoretical limits.

Step 1. Feed Material Preparation. Hollow spheres of the desired character may be created if a glass former is provided which in its final glassifying stages has a relatively high viscosity and surface tension but yet in the early melt stages forms a continuous shell to contain gases within the void defined by the shell. Secondly either the glass forming material or some additive must provide gas to pressurize the interior void of the micro-sphere during the viscous state of the shell to maintain its configuration. Consideration of these requirements gave rise to the instant two part glass former.

Our glass former comprises admixed sodium silicate, a low temperature glass former and apparently a flux for a naturally occurring soda feldspar, the high temperature glass former, commonly known as Wenatchee feldspar which is intumescent or bloatable at glassifying temperatures. Additional additives such as "Cab-o-sil", a trade name for a proprietary product of the Cabot Corporation, Boston, Mass., for colloidal fumed silica, to aid prilling, sodium carbonate to provide additional gas evolution or other bloating or fluxing agents may be provided.

The soda feldspar preferred as a high temperature glass former comes from a naturally occurring, igneous deposit near Wenatchee, Washington. It is petrographically a soda feldspar (albite) with some identifiable quartz and mica, largely in the form of biotite. The material has some water of crystalization and possibly entrapped gas which apparently contribute substantially to the intumescence. The chemical composition of this soda feldspar is:

| | |
|---|---|
| $SiO_2$ | 69.4% |
| $Al_2O_3$ | 19.11% |
| $Na_2O$ | 9.34) |
| | 11.04% |
| $K_2O$ | 1.7 ) |
| CaO | 0.22% |
| $Fe_2O_3$ | 0 .05% |
| | 99.82% |
| Loss on ignition | .18% |
| | 100.00% |

The material, physically beneficiated by removal of the separable and identifiable fractions of mica and quartz in a $-325$ mesh sample is as follows:

| | Average percent composition | Variation range percent composition | | |
|---|---|---|---|---|
| $SiO_2$ | 73.35% | 71.5 | – | 73.5 % |
| $Al_2O_3$ | 17.24% | 15.52 | – | 18.96% |
| $Na_2O$ | 7.30% | 6.21 | – | 8.39% |
| $K_2O$ | 0.37% | 0.0 | – | 1.5 % |
| CaO | 1.19% | 1.10 | – | 1.26% |
| $Fe_2O_3$ | 0.05% | 0.01 | – | 0.1 % |

The material in its natural state appears to be reasonably homogenous and random samples of it have not shown a variance range more than two or three percent. SImilar feldspars within this compositional range occur within the general geographical area, and are known elsewhere in the world.

The original laboratory composition from which micro-spheres were initially formed was:

Composition 1

| | |
|---|---|
| Sodium Silicate Solution | 60 grams |
| Cab-o-sil | .6 grams |
| Felspar (Wenatchee) | 15 grams |

Various modifications of this formula have been made, especially to accommodate the material for use in commercial spray dryers. Throughout there has been an attempt to maintain the compositions in the approximate proportion by weight of 60-20-20, the numbers representing respectively the silica, alumina and soda oxides. The various modified compositions used in commercial spray dryers are:

Composition 2

| | |
|---|---|
| Water | 1147.3 lbs. ) |
| Sodium Carbonate | 250.0 lbs. ) |
| Sodium Silicate Solution* | 1270.0 lbs. ) 42.4% solids |
| Feldspar (Wenatchee) | 500.0 lbs. ) |
| Cab-o-sil | 12.7 lbs. ) |

Composition 3

| | |
|---|---|
| Water | 30 lbs. ) |

-Continued

Composition 2

| | | |
|---|---|---|
| Sodium Silicate Solution* | 500 lbs. ) | |
| Cab-o-sil | 10 lbs. ) | 46.8% solids |
| Feldspar (Wenatchee) | 100 lbs. ) | |

Composition 4

| | | |
|---|---|---|
| Water | 30 lbs. ) | |
| Sodium Silicate Solution* | 500 lbs. ) | |
| Cab-o-sil | 5 lbs. ) | 46.4% solids |
| Feldspar (Wenatchee) | 100 lbs. ) | |

Composition 5

| | | |
|---|---|---|
| Water | 50 lbs. ) | |
| Sodium Silicate Solution* | 500 lbs. ) | |
| Cab-o-sil | 5 lbs. ) | 45.8% solids |
| Feldspar (Wenatchee) | 100 lbs. ) | |
| Sodium Carbonate | 11 lbs. ) | |

* A commercial aqueous solution of sodium silicate, principally the metasilicate, $NaSiO_3 \cdot 9H_2O$.

The idealized compositions have evolved over a period of experimentation, but the material has been found operative with sodium silicate ranging to 90 percent of the total solids and Wenatchee feldspar ranging to 50 percent. The sodium carbonate is not an essential ingredient, but when used it is operative in ranges up to 15 percent of total solids.

The amount of water is, of course, not critical to the glass forming process but it is an adjustable parameter in the prilling process. The feldspar is preferably reduced to −325 mesh and the other ingredients either dissolved or reduced to a similar particle size. With the glass former and additives in this physical state, it has been found that most commercial spray dryers required sufficient water to reduce the solids content of the resultant slurry to a range of from 42 to 47 percent, with the solids ratio of 45.8 percent of composition 5 being nearly ideal.

The whole slurry is intermixed, preferably in a high shear-type blender, and operated upon thereby until a substantially homogenous liquid-based slurry results. Agitation is preferably continued during existence of the slurry to maintain the homogeneity it be prilled.

Step 2. Prilling. The slurry material is next formed into a hollow spherical shell by a prilling process to provide a product of appropriate dimension and geometry and sufficient strength to allow further processing. Prilling of the water or liquid-based slurry is accomplished by spraying the slurry in droplet form into a heated drying tower to thereby form and dry discreet feed particles of spheroidal configuration during passage of the droplets through the heated drying tower. Normally the water content of the prilled feed material will be low to avoid caking, though it must be sufficient to provide appropriate rigidity and particle adhesion.

The material of Composition 2 was prilled in a 4 foot 6 inch parallel flow spray dryer of the Swenson Division of Whiting Corporation of Harvey, Illinois. The dryer is illustrated in FIG. 5 of the accompanying drawings where it is seen that air is provided direct through filter 10 to primary fan 12 which supplies the air under pressure through heater 13 and thence to hot air distributing head 14 from which it is turbulently distributed in vertical prilling tower 20. Secondary fan 16 provides pressurized air to operate the lower portion of the prilling apparatus, from which the prilled product is moved into primary cyclone collector 15 and thence conveying cyclone collector 17 to ultimately be deposited in product drum 19. Conveying fan 11 transfers the product in the secondary system.

In the prilling step, each droplet of the slurry forms a sphere having a porous surface that allows escape of water of crystalization and water vapor, as well as heated air within the sphere. The feed particles are then cooled preparatory to final glassification. The dried spherical particle then has a shell of finely divided powder, an interior of air and water vapor, and is nicely spherical in shape. The porous exterior shell is very important to my process. The moisture content of the feed particle will be between 5 percent and 15 percent after forming but will lose moisture on storage until there is little detectable. A dry feed particle is quite friable and hence easily damaged in handling. The moist particle can be stored for months in a closed container with a polyethylene sack liner.

The slurry prilled through this system varied in solid concentration from 26 to 46 percent and ranged in specific gravity from 1.193 to 1.463. The spraying parameters differed widely, but with appropriate adjustment the product appeared prillable throughout the range. It prilled best with high air flow rates and tower temperatures ranging from 400° to 600° Fahrenheit. The moisture content of the prilled product ranged from 6 to 20 percent, but in the more moist states it tended to cake. The bulk density of the product (loose) ranged from 25 to 45 lbs. per cubic foot and depending upon spray conditions more than half of the product could be maintained within any 20 mesh size range from less than 40 (420 microns) to 325 (44 microns).

Similar prilling tests have been run in other commercial spray dryers with comparable results. The various parameters relating to any particular dryer must be adjusted to the particular product, but those set forth are typical and the parameters for other commercial spray dryers are well within the range of limitations of the material.

It appears that the moisture content of the formed product should be relatively low and the product should be relatively cool before bulk storage or it has a tendency to compact and cake. Caked feed material appears to again separate to a degree upon further cooling and drying but oftentimes with some particle damage. Some problem was experienced with product accumulation upon prilling tower walls but this may be effectively dealt with or eliminated by appropriate cycloning of the air flow as known in the prilling arts.

The prilled product forms a spheroidally shaped shell defining an internal void. The shell, of a thickness approximating ⅓ of the diameter of the particle, constitutes a relatively dense, rigid material having some degree of resistance to crushing and being relatively free flowing in bulk when appropriately dried and cooled. The size variations produceable range from less than 50 to more than 500 microns in diameter with geometry, dimension and shell thickness controllable within limits by prilling parameters.

Step 3. Product Support. During the glassifying action the prilled feed particles must be supported against gravity displacement and preferably isolated from other feed particles to avoid cannibalism or agglomeration.

One method of support is by use of an individually celled, thermally resistive boat such as illustrated in the drawings of FIG. 3. A rectilinear compressed graphite block 21 is provided in its upper surface with spaced, arrayed hemispherical indentations 22 to hold each individual feed particle. The individual indentations 22 are hemispherically shaped to aid formational geometry and preferably sized at or slightly smaller than that of the expanded, glassified micro-sphere so that upon formation the sphere will rise slightly from the cell to aid extraction. Any number of such indentations may be arrayed in a graphite boat; the boats commonly used to date have been of a rectilinear configuration with dimension of a few inches and have contained several thousand individual cells. It is desirable to design boats with as little mass as practicable to avoid unnecessary heat expenditure.

To aid in loading such a boat a relatively thin, sheet-like mask 24 may be provided with holes arrayed to mate with the individual cells of the graphite boat. The mask may then be properly positioned above the cells and bulk product moved thereacross by brush or similar means to deposit prilled particles in each cell.

Obviously other forms of refractory support that are not wet by molten glass might be used so long as they support the feed material, separate it, and aid the formational geometry. Flat planar boats have been used but they tend to create beads with a flattened lower surface and especially in small sized feed particles tend to allow cannibalism and agglomeration to create non-homogenous bloated masses of irregular geometry. With smaller sized feed particles it does not seem to matter particularly whether the material in a depression is a single particle or several particles totaling the appropriate mass, as a hollow sphere is formed in either case.

Support of the feed particles during final glassification can also be accomplished by gaseous means (FIG. 6), by use of a fluidized bed (FIG. 7), or by any other suitable support apparatus or process that can maintain individual separation between the particles.

Figure 6:
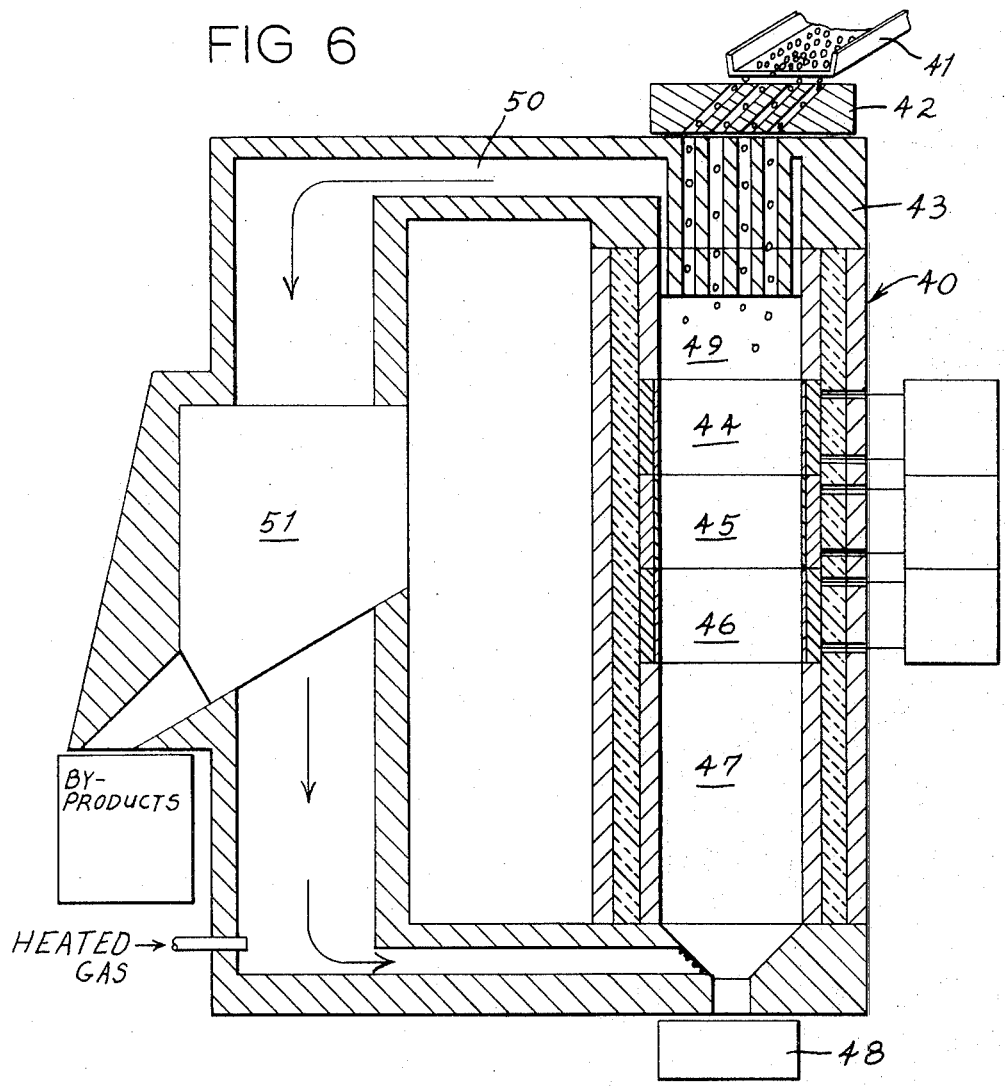
FIG. 6 is a schematic view of a heating apparatus for the feed particles using gaseous particle support.

FIG. 6 shows the basic structure of a vertical furnace with means for supporting individual particles in a heated gas updraft. Incoming feed particles are directed into the furnace 40 at its upper end by means of a vibratory feeder 41 that travels about an apertured distributor 42 leading to intake tubes in the furance cover 43. The furnace has three vertically stacked heating zones 44, 45, 46 using electrical resistance elements, and a lower cooling zone at 47. The upwardly-moving gas supports and retards gravitational movement of the feed particles. The glassified spheres are collected in a lower container 48. Hot gas is recirculated through a return stack 50 provided with a cooling condenser apparatus 51 for recovery of by-products.

Separation of the feed particles can be further assured by electrostatic charge of the particles and furnace surfaces, giving the same polarity to each. The particles will then repel one another and will be further repelled by the furnace surfaces.

Figure 7:
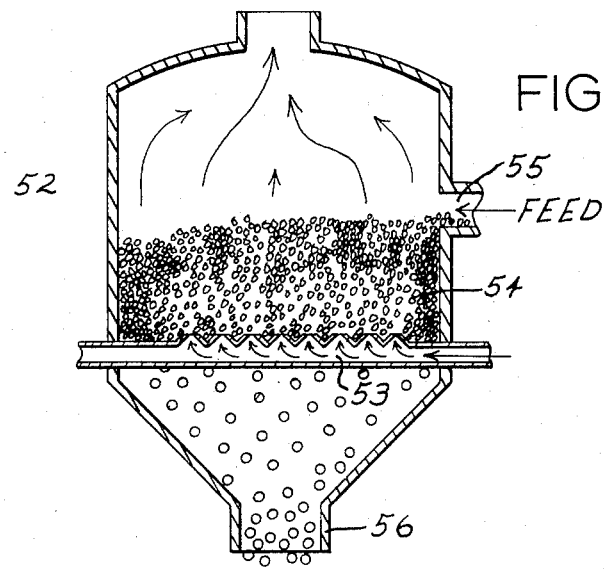
FIG. 7 is a schematic view of a heating apparatus for the feed particles using fluidized bed support.

FIG. 7 shows schematically a heated fluidized bed for glassification of the feed particles. The fluidized reactor 52 uses a lower distributor 53 to direct gas upwardly through the mass of feed particles 54 which enter the reactor 52 by means of a feed entrance at 55. The glassified product falls through the lower portion of the reactor and is cooled by the time it reaches the product exit at 56. The operation of the fluidized bed follows known principles for such equipment. Again, separation of the particles and reactor surfaces can be enhanced by electrostatic charge.

Step 4. Heating to Glassification. The individualized, supported feed particles are appropriately heated to glassify and refine the shell material to form a hollow glass micro-sphere.

The process may be carried out in a tunnel furnace 25 which in experiments has been electrically heated (FIG. 1). Loaded carbon boats are mechanically conveyed into and through the furnace by conveyor 26. The furnace itself has essentially four distinguishable areas: pre-heat 27, high heat 28, soaking heat 29, and cooling zone 30, each preferably separately controllable and normally somewhat subdivided in some fashion from the other.

The initial preheat zone has an ambient temperature of some 1800° Fahrenheit to bring the temperature of the graphite and supported feed particles up to a temperature of some 1200 to 1500° Fahrenheit. The exact temperature is not too critical but it does affect the time of the feed particle in the high heat zone. The ambient temperature in the high heat zone is some 2800° Fahrenheit to bring the feed particle to a temperature between 2200 and 2800° Fahrenheit; this temperature must be accurately controlled as hereinafter specified for proper operation of the process. Fusion temperature in the soaking area is somewhat below the softening temperature and again must be individually determined in each instance, but generally ranges from 2000 to 2500° Fahrenheit. The temperature in the cooling area should be such as to bring the temperature of the glassified micro-spheres to a point at which they are solidified to a reasonably rigid state and one whereat the graphite boats will not be damaged by exposure to the ambient atmosphere, normally a temperature of some 400 to 500° Fahrenheit.

As the feed particles heat, the sodium silicate glassifies at a relatively low temperature to create a continuous shell-like film about the interior void of the particle by forming a matrix over and about the feldspar particles which require a higher temperature to fuse. When the center void is enclosed by the film the gasses in the interior void, and those liberated by the shell material expand to create internal pressure to maintain the spherical geometry of the thin plastic particle. Gas oftentimes will be evolved in the glassifying shell structure itself to migrate as seeds either inwardly or outwardly as in normal glass refining. As the process continues, upon appropriate heating, the glassifying sphere ultimately will rupture from excessive internal pressure and included seeds only to reform again and continue the process. Upon each rupture, however, the bubble will lose some of the ultimate gas which was originally entrained and will tend to become slightly smaller with thicker walls. Thusly by appropriate regulation of heating time and temperature cycles, the rupturing may be controlled and product produced of desired size and wall thickness depending upon the size and composition of the feed particle and the time and temperature of heating, all to provide a process with such controllability as to produce a sophisticated product. This bubble formation and bursting may actually be individually controlled, if desired, to give an even higher degree of sophistication, though in general this has been found not necessary as the product is of sufficient uniformity that all bubbles behave within the same general class.

The point of bloating or intumesence of a heating micro-sphere may be conveniently determined by an optical pyrometer appropriately focused. The sphere will expand fairly rapidly and as it does its optical area will increase rapidly. This will be sensed as an increase of temperature by the pyrometer to indicate the bloating. Thusly the first or any subsequent sphere expansions or collapses may be determined and sphere thermal history appropriately determined.

As the melting process proceeds in the soaking zone, the glass matrix and contained fluxes tend to lower the melting temperature of the feldspar about the surface of the feldspar particles and it enters into solution in the glass shell of the micro-sphere. As this occurs, however, the feldspar contributes its physical characteristics of high viscosity and high surface tension to the glassifying shell to allow formation of larger beads and maintenance of good spherical geometry. Ordinary molten glass varies in viscosity up to about 300 poises with a surface tension of around 300 dynes per square centimeter. The glass of our process and composition has melt viscosity in the one to ten million poise class and surface tensions of about 690 dynes per square centimeter. This allows our larger bubbles to form and enlarge without rupture and with sufficient pressure differential to maintain the spheroidal geometry. The eutectic point of the product is approximately 975° centrigrade in homogenous material. The viscosity and surface tension of the shell may be even further increased by use of potassium feldspar as the high temperature glass former but it generally is not so effective as soda feldspar in the ranges here presented.

As an example of heat treatment, prilled feed particles of Compositions 2, 3, 4, and 5, sized with 85 percent larger than 175 microns and ranging randomly to 500 microns, were supported in ⅛ inch hemi-spherical indentations in 1×5×24 inch graphite boats, were heated at 1500° Fahrenheit for one minute and then raised to 2750° Fahrenheit for five minutes and cooled to less than 500° Fahrenheit in five minutes, all in a cracked ammonia atmosphere. The product formed clear to cloudy glass micro-spheres with good spherical geometry. Some samples were difficult to release from the boats. Larger spheres with thinner walls were formed at lower temperatures but as temperatures increased and were maintained for longer periods, smaller spheres with thicker walls were formed. At two minutes of heat in the high heat zone there were a fair number of inclusions and seeds in sphere walls but these substantially disappeared between four and five minutes at which time the bubbles had smooth, clear outer shells.

Some problem was experienced with the carbon boats if the individual cells were substantially smaller than the initial glassified size of the micro-spheres, as they tended to eject with some force from the cells. The size of the supporting cells should be rather carefully controlled for if the glassifying micro-spheres do eject with too great violence they tend to be lost or physically damaged in the furnace.

The overall mass of the boats should also be controlled to a minimum to avoid an excessive expenditure of heat in raising the temperature of the boats. Boat temperature must be maintained at or near micro-sphere temperature, especially in the higher ranges, or sphere geometry will suffer and some product will have thickened or flattened bottoms.

Various inert atmospheres have been used in the heating process and appear to have no adverse effect upon the glass forming capabilities of the feed particles. An inert atmosphere is oftentimes necessary or desirable to preserve the graphite boats, other supports and furnace elements themselves. Hydrogen has been used to produce a reducing atmosphere which seems to have little if any effect on the glass; carbon dioxide tends to produce red or orange colored spheres; air tends to produce milky spheres; argon tends to produce spheres with a greenish color and cracked ammonia has been used quite economically and effectively to produce clear spheres. All of these spheres have otherwise had substantially similar properties.

In the use of gaseous stream support within the furnace 40 (FIG. 6), the cool feed particles are fed downward through a cylindrical vessel. A part of furnace 40 is the preheat section 49 where the feed particles are heated to just below the softening temperature (1600°F.). As these particles leave this preheat section 49, they are electrostatically charged with the same polarity as that of the furnace lining. This keeps the particles separated in the high heat zones 44, 45 and 46, and also keeps them separated from the charged graphite furnace lining. This lining is protected from the oxidizing of the oxygen released by the feed material by a reducing gas such as hydrogen, cracked ammonia (75 percent H), carbon monoxide or by an inert gas such as argon, helium or carbon dioxide. Nitrogen is an inert gas but it tends to create pockets in the glass shell of the hollow spheres.

The gas temperature in the hottest part of the furnace should be between 2800° and 3000° F. It may be higher if pure silica spheres are to be made. This gas may be heated externally by a heat exchanger using gas or oil as fuel. It may also be heated by moly elements in the furnace as these are protected by the hot gas. Radio frequency heating from a water cooled coil wound around the furnace and protected by graphite wool insulation has been used. The method of heating is not important. The hot gas should be retained in the furnace by recirculation as shown so that new gas can be added as a supply for that discharged with the spheres. Part of this recirculation system is the cooling section shown at 51 where metallic elements in the feed material are condensed and held in an anti-oxidizing atmosphere. Means are provided to remove this material when sufficient amounts have accumulated on the cooling plates.

An important part of the heating process in the furnace is the time and temperature relationship. When the feed particles enter the hot zone in the furnace, it meets the very hot gas and this sears the surface of th sphere almost instantly. When this happens, the fine particles making up the surface of the sphere are sealed, the gas inside is heated and starts to expand. As the pressure inside increases, it expands the shell of the sphere which also binds the particles making up the surface tighter together which in turn increases the rate of heat transfer to these particles and this soon forms a complete shell. This shell is in the soft or plastic condition so that it can expand and does. If the expansion is too fast or too much, the shell will rupture and collapse. The interior gas will again increase in temperature and expand the shell but this shell will be thicker and more perfect than when first formed. This process may be repeated several times before the hollow sphere is discharged depending on the time and temperature in the hot zone. Turbulence of the hot gas will tend to retard the particle and subject it to more heating.

The actual time in the furnace is very short but it is much more than the calculated time for a free falling particle in a hot gas. The reason for this is that glass is a poor conductor of heat, especially the melting of the fine particles that make up the sphere surface. It has been experimentally determined that fine particles will melt faster than larger ones as they present much more surface to the hot gas. However, the outer surface of the feed particles is porous at the start of heating. This allows vapor to escape. At the temperature in this furnace, some of the oxygen in the oxides which makes up the glass composition will combine with the hydrogen (if this gas is used) to form water. This waer instantly turns to steam as it is above the critical temperature when water could remain liquid under pressure. Hence, this water will escape through the porous surface of the particle and will travel with the gas. This is one explanation of why the moisture in the feed particles does not affect the bloating.

The two composition glass making material which constitutes the porous shell of the feed particle is a decided advantage in the sealing of the surface which in turn starts the bloating process by preventing the escape of the interior gas of the particle. The lower temperature of melt of the cullet or sodium silicate glass affects this sealing quicker than would be the case with the feldspar alone. However, the high viscosity of the feldspar when it softens is essential to resist the internal pressure created by the heating of this gas. A low viscosity glass such as the cullet or sodium silicate glass alone would have a viscosity at melt of 300 to 3000 poises but our feldspar has a viscosity at melt of as high as 3,000,000 poises. Actually, these numbers are not an exact comparison as the melting of the cullet or sodium silicate glass affects the melt temperature of the feldspar by adding to its sodium ions, at the time of softening and thus lowering the melt temperature.

Another factor in this time temperature relationship is the preheating of the feed particle in section 49. If this temperature is 1800 F. or higher, the lower temperature glass particles in the shell will seal the shell and allow some bloating to take place prior to the high temperature zone. This temperature is not high enough to soften the feldspar but the porous nature of the feed particle allows some gas pressure to escape and the shell to expand by separating the unsoftened feldspar particles. This in turn will allow the heat in the high temperature zone to penetrate and transfer more rapidly than would be the case without this preheat. One difficulty with the preheat zone is that it is difficult to keep the feed particles from joining together. This will then result in larger spherical particles in the high temperature zone. If too many feed particles join up, the resulting hollow sphere will be too large and too thick in the shell with consequent higher density. Hence the electrostatic separation is very important. There are several methods of mechanical separation of these feed particles which have been tried. One of these is to feed the feed particles individually from a vibrating feeder. Another was a feed wheel with semi-spherical depressions in the surface which allows only one particle at a time to enter the furnace. The preheat can be done on this feed wheel by means of electric heating elements. This wheel will also act as a seal to prevent the escape of the hot gases in the furnace.

I have found that if a quick acting "solid state" optical pyrometer is set so as to view the falling (or rising) feed particles at such a level that these feed particles are viewed by this pyrometer when they reach the desired amount of bloating, there is a temperature "kick" shown on the scale of the pyrometer. This "kick" can be used to actuate a contact which will either eject these spheres or effect their rapid cooling so as to freeze them in the desired size and density range. More than one pyrometer can be placed at varying levels so that the spheres can be measured at more than one time of bloating as was explained above. A single feed particle has been observed to bloat, collapse and bloat again as many as five cycles. Each cycle seems to form a more perfect sphere with a more transparent shell but with slightly smaller outside diameter and greater density. Hence if the lightest density is desired, one must choose the greatest expansion and sacrifice some transparency and strength. However, there is a choice of gas temperature, glass composition, preheat time and temperature and all of these have an effect on the ultimate result. For instance, lowering the gas temperature affects the rate of heat transfer in a given time by a much greater amount than this temperature difference. The "kick" noted above registered about 200°F. on the pyrometer for a fraction of a second in the free fall furnace but was slowed in the single particle furnace so that it showed for 2 or 3 seconds. This "kick" was abrupt at the time of start and just as abrupt at the finish. It seems that this sudden temperature rise is not actually a temperature rise but that the optical pyrometer "sees" it as a temperature rise because all of a sudden there is a bloated sphere in the field of view and just as suddenly it is gone. The viewing port for the optical pyrometer has a glass lens which is opaque to the background temperature which in the case of my furnace was the lining of the furnace. This selection is one of choosing the lens and calibrating the pyrometer properly.

In general, the same considerations of gas temperature and dwell time discussed above hold true for use of a fluidized bed reactor 52 as shown in FIG. 7.

Step 5. Cooling and Removal for Processing. After the glassified micro-spheres have cooled sufficiently to be rigid and the boats have cooled so that they are not damaged by the ambient atmosphere, both are removed from the furnace. The cooling temperature with graphite boats should generally be less than 500° Fahrenheit to preserve the boats. The micro-spheres may be manually removed from the boats by gravity upon tipping. The spheres should in general be handled with the least physical damage possible to prevent occurrence of surface flaws which apparently materially weaken them.

Some difficulty has been experienced on occasion by micro-spheres sticking within the carbon boats. Normally this is not serious and usually amounts to less than one percent of the glassified product. The sticking appears to be due to some inclusion or foreign material causing a wetting of a portion of the carbon surface by the glass. To remedy this problem the carbon surfaces should be kept as clean as possible, but when sticking occurs the boats may be cleaned or resurfaced by physical method.

The micro-spheres upon cooling to the temperature of the ambient atmosphere are then ready for storage or further processing.

The density of micro-spheres produced by the heating process specified averaged 0.661 grams per cubic centimeter with extreme variances between 0.514 and 0.963 grams per cubic centimeter. More than 90 percent of the spheres survived hydrostaic loading of 6,000 pounds per square inch of pressure and individual micro-sphere strengths were measured above 20,000 pounds per square inch. The micro-sphere surfaces were generally clear and homogenous in appearance. What few inclusions that could be isolated and identified were found to be particulated carbon. The sizes of micro-spheres produced ranged from 50 microns to above 2000 microns, depending principally upon the initial amount of feed material. The micro-spheres have quite regular surfaces, readily adaptable to bonding in plastic matrixes or susceptible to etching or coating.

The formation of a hollow "feed" particle with a porous shell allows the $P_1 - P_2$ differential pressure to reduce by allowing escape of part of $P_1$ through the shell until the conditions on the right side of this equation are stabilized in the furnace of FIG. 6. Without this pressure escape, the increase in R would far overshadow increase in S and explode the sphere. This is a phenomenon of heat transfer since $P_2$ remains nearly constant regardless of sphere shell temperature and $P_1$ is determined by Boyles Law - "If the temperature is constant, the pressure of a given quantity of a gas is inversely proportional to the volume it occupies" - therefor PV is constant. However, the interior gas is heated by the exterior gas through the porous shell very rapidly but heat transfer to the shell itself is relatively slow so that the "low temperature" glass former particles and decrease rate of heat transfer. More important and essential is the fact that "sodium silicate" particles form glass of low viscosity (3 to 300 poises) whereas sodium feldspar forms glass of much higher viscosity (3,000,000 poises) but this is rapidly reduced by solution with the sodium silicate glass. However, the resultant viscosity is considerably more than that of lead, borax or soda-lime glasses used in formation of the tiny spheres of othe processes.

If $P_1$ increases faster than $4S/R$ it must be relieved through the sphere shell, the sphere collapses, increasing $P_1$ by Boyles Law and expansion starts again. By this time S has increased because of glass formation in the shell being more complte due to heat transfer. Surface tension S is related to viscosity. It is low in the porous shell but increases as the particles forming the porous shell coalesce.

In the prilling tower where temperature of the supporting gas is lower than the softening temperature of the glass former materials, viscosity is low in the slurry but changes little on heating, whereas as the water in the slurry is evaporated, the surface tension increases to draw the particles in the shell together, the heat turning the water to steam expands the sphere and the internal pressure is reduced as the steam escapes through the shell and is evaporated into the hot air entering the prilling tower or fluid bed. Therefore $P_1 - P_2$ is only sufficient to expand the shell, it cannot increase much because the shell is porous but since the interior heating air is hotter than boiling temperature of water, the interior (feed particle) water flashes to steam and expands roughly 1800 times in volume forcing the particles outward and forming a hollow porous spherical feed particle. This viscosity and surface tension forces are used in both the furnace and prilling tower or fluidized bed but for different results and reasons.

The addition of sodium carbonate or "soda ash" of commerce is primarily for the addition of sodium oxide in the glass composition to aid in "stirring" the glass during melting. The $Na_2CO_3$ evolves $CO_2$ by heat, the $CO_2$ aids the bloating but most of this is the expansion of steam and air in the feed particle. Regardless after cooling there is little but a vacuum in the sphere.

It is to be noted from the description of our process that it provides sophisticated micro-spheres of high quality, great sphericidity and dimension and wall thickness controllable in response to parameters of the process.

It is further to be noted that the process allows formation of micro-spheres of larger sizes and great strength by reason of the two part glassifying compound which creates a greater viscosity and surface tension during the melt.

The foregoing description of our invention is necessarily of a detailed nature so that a specific embodiment of it might be set forth as required, but it is to be understood that various modifications of the processes and rearrangement and reordering of elements may be resorted to without departing from its spirit, essence or scope.

Having thusly described our invention, what we desire to protect by Letters Patent, and

What we claim is:

1. A process for forming hollow glass micro-spheres comprising the following steps:

admixing at least one finely particulated, high temperature soda feldspar glass former and at least one low temperature sodium silicate glass former in a liquid to form a liquid-based slurry;

prilling the liquid-based slurry by spraying the slurry in droplet form within a heated drying tower to thereby form and dry discrete feed particles of substantially spheroidal configuration during passage of the droplets through the heated drying tower, the feed particles being heated during such passage to a temperature sufficient to glassify the low temperature glass former but below the level required to glassify the high temperature glass former, each resulting feed particle having a porous outer shell of the low temperature glass former and particulated high temperature glass former arranged about an internal void;

cooling the feed particles;

individually separating and supporting the feed particles while heating each feed particle to glassification of the high temperature glass former to produce hollow glass micro-spheres; and cooling the individual glassified micro-spheres to solidification.

2. The invention of claim 1 wherein the feed particles during heating and glassification of the high temperature glass former are individually supported in a multiplicity of conformable indentations in thermally resistive boats of rigid material not wet by molten glass, each conformable indentation being substantially the same size as the glassified micro-spheres to be formed to aid the geometry of formation and separate the micro-spheres.

3. The invention of claim 2 wherein the prilled particles are spheroidal in shape and range in external diameter from 50 to 5,000 microns with wall thickness approximately one-third to one-fourth of the diameter of the prilled particle.

4. The invention of claim 2 wherein the slurry prior to prilling has added bloating material that forms gas upon heating to temperatures higher than the glassifying point of the low temperature glass former.

5. In the thermal process for forming hollow glass micro-spheres;
   the admixture of a finely divided, high temperature soda feldspar glass former and a low temperature sodium silicate glass former in water to form a water-based slurry;
   the prilling of the liquid-based slurry by spraying the slurry in droplet form into a heated drying tower to thereby form and dry discrete feed particles of substantially spheroidal configuration during passage of the droplets through the heated drying tower, the hollow feed particles having external diameters substantially between 50 and 5,000 microns, and being heated to a temperature sufficient to glassify the low temperature silicate glass former to cooperate with the particulated high temperature feldspar glass former to define a substantially continuous shell about an internal void;
   cooling of the feed particles;
   individual separation and support of the feed particles while heating each feed particle to an elevated temperature for glassification of the high temperature glass former, maintaining the elevated temperature for a time sufficient to achieve glassification of the high temperature glass former to produce hollow glass shells substantially free of seeds; and
   cooling of the individual glassified shells to rigidity.

6. The invention of claim 5 further characterized by:
   the low temperature glass former constitutes from 10 percent to 90 percent sodium silicate;
   the high temperature glass former constitutes 80 percent to 20 percent of a soda feldspar; and
   the particle heating is in an ambient atmosphere of from 2500° to 2800° Fahrenheit for at least 90 seconds.

7. The invention of claim 5 further characterized by:

a relatively slow preheating of the feed material to a temperature slightly below that required for glassification of the low temperature glass former immediately prior to glassification of the low temperature glass former.

8. The invention of claim 5 wherein the heating, glassification, and cooling of feed particles is carried out in a gaseous atmosphere other than one containing oxygen.

9. The invention of claim 5 wherein the feed particles are supported during heating and glassification of the high temperature glass former and subsequent cooling in plural individual hemispherical cells, of a size substantially the same as the micro-spheres to be formed, in some rigid thermally resistive substance not wet by molten glass.

10. The invention of claim 9 further characterized by:
    the step of adding to the glass formers, prior to prilling, a quantity of up to 20 percent of a finely divided bloating agent that forms gas upon heating in the feed particles, at least part of the gas being formed after glassification of the low temperature glass former.

11. The invention of claim 9 wherein the feed particles are conformably supported during heating and glassification of the high temperature glass former and subsequent cooling in a thermally resistive material not wet by the molten glass.

* * * * *